United States Patent [19]

Goscenski, Jr.

[11] Patent Number: 4,507,984
[45] Date of Patent: Apr. 2, 1985

[54] SINGLE SHAFT POSITIVE DRIVE

[75] Inventor: Edward J. Goscenski, Jr., Battle Creek, Mich.

[73] Assignee: Eaton Corporation, Cleveland, Ohio

[21] Appl. No.: 355,971

[22] Filed: Mar. 8, 1982

[51] Int. Cl.³ .................................................. F16H 35/04
[52] U.S. Cl. ...................................................... 74/650
[58] Field of Search .................. 74/711, 710.5, 650

[56] References Cited

U.S. PATENT DOCUMENTS

| | | | |
|---|---|---|---|
| 1,111,728 | 9/1914 | Besserdich et al. | 74/710.5 |
| 1,275,952 | 8/1918 | Luxmore | 74/650 |
| 1,477,310 | 12/1923 | Cartwright | 74/650 |
| 1,477,311 | 12/1923 | Cartwright | 74/650 |
| 1,704,861 | 3/1929 | Lewis | 74/650 |
| 2,050,344 | 8/1936 | Lapham | 74/713 |
| 2,060,558 | 11/1936 | De Lavand | 74/650 |
| 2,179,923 | 11/1939 | De Lavand | 74/650 |
| 2,509,560 | 5/1950 | Craft | 74/650 |
| 2,555,044 | 5/1951 | Lewis | 74/650 |
| 2,667,088 | 1/1954 | Myers | 74/650 |
| 2,978,929 | 4/1961 | Roberts | 74/711 |
| 3,313,180 | 4/1967 | Balfour et al. | 74/711 |
| 3,397,593 | 8/1968 | Knoblock | 74/650 |
| 3,831,462 | 8/1974 | Baremor | 74/711 |
| 3,837,236 | 9/1974 | Kagata | 74/711 |
| 3,906,812 | 9/1975 | Kagata | 74/650 |
| 4,159,656 | 7/1979 | Tomich | 74/650 |
| 4,400,996 | 8/1983 | Schou | 74/650 |

FOREIGN PATENT DOCUMENTS

| | | | |
|---|---|---|---|
| 2475660 | 8/1981 | France | 74/650 |
| 485519 | 10/1953 | Italy | 74/650 |
| 111670 | 8/1918 | United Kingdom | 74/650 |

Primary Examiner—George H. Krizmanich
Assistant Examiner—Dirk Wright
Attorney, Agent, or Firm—C. H. Grace; L. J. Kasper

[57] ABSTRACT

A positive drive having a housing (10) retaining a pair of spaced drive clutches (54) and (56) used to lock axles (18) and (20) respectively to housing (10) for one-to-one rotation. The clutches move from the engaged to the disengaged mode via axial movement of drive couplings (30) and (32) which are forced to the respective engaged positions by a shaft (48) secured for rotation with the housing. The shaft acts on cams (38) and (40) on the drive couplings to cause rotational and axial movement of the couplings. Rotational movement of one drive coupling relative to the other drive coupling is prevented by a balking clamp (76). The clutches (54) and (56) are inserted within the housing through a window (14). The axles are retained by "C" clips (80) contacting spline couplings (26) and (28).

22 Claims, 6 Drawing Figures

SINGLE SHAFT POSITIVE DRIVE

Traction modifying devices find utility in driving wheels of vehicles through snow and in off-road conditions. These devices are generally categorized in one of three classes:

1. Limited slip differentials such as illustrated in U.S. Pat. Nos. 3,624,717 (spring biased), and 3,611,833 (non-biased);
2. Locking differentials such as illustrated in U.S. Pat. Nos. 3,831,462 (speed responsive); 1,111,728 (manually actuated), and 2,978,929 (hydraulically operated); and
3. Positive drives such as illustrated in U.S. Pat. Nos. 1,477,311; 2,060,558; and 2,179,923.

This application is directed to an improved positive drive.

During straight movement of a vehicle employing a positive drive the power from the engine is transmitted approximately equally to each of the driving wheels. During a potential spinning condition, where one wheel may be located on ice and the other wheel located on dry pavement, the engine's power is transmitted to each of the wheels in proportion of their driving traction limitations to cause the wheels to rotate at the same angular velocity. When the vehicle, however, turns a tight corner the power transmission is passed only through the slower moving wheel. The faster moving wheel is permitted to free wheel. When the vehicle is turning less than a tight corner but is not moving in a straight line the positive drive transmits driving torque to each of the driving wheels in a proportion that is less than equal. Thus a positive drive acts as an open differential during operating conditions where an open differential is desired and a rigid axle during operating conditions where a rigid axle is desired.

The method of accomplishing the foregoing results has been known for over 40 years as evidenced by U.S. Pat. Nos. 2,060,558 and 2,179,929. In positive drives, the drive cam couplings must not allow opposed engagement (i.e., one drive clutch is engaged to drive forward while the other drive clutch is engaged to drive in reverse). Thus, when a drive clutch must overrun, it is important to restrict the degree of travel of the cam to prevent any possible opposed engagement. In a turn, opposed engagement would cause the outside wheel to retard motion or drag to such a degree that a wheel would have to slip. Such slipping typically results in a torque of 1000 ft. lbs. on a dry surface.

Another major disadvantage of previously known positive drives is that they employ a central cam member which requires the use of a two piece housing. Since tremendous axial forces are exerted on the components of a positive drive and the housing, the two pieces must be securely fastened. The manufacture and assembly of two piece housings is also both time consuming and expensive.

As vehicles are continually "downsized" it is desirable to produce traction modifiers of minimal size and weight. The use of the central cam members to date in positive drives has made such production extremely difficult.

Further, it is desirable to have a traction modifier that is readily understood and easy to repair by a mechanic.

As is well known in the art, most traction modifiers which are currently in commercial use are utilized in conjuction with a pair of drive axles which include some sort of inboard retention means, rather than being of the "full-float" type in which the axles are retained only at the wheels. For example, it is fairly common for each of the drive axles to include an annular groove at its axially inner end, with a retention device such as a C-clip being snapped into place in each of the grooves to prevent (or limit) movement of the axle in an axially outward direction. Because the use of C-clip axles is so prevalent, it is very important in marketing a traction modifier that it be usable in conjunction with C-clip axles. It is readily apparent from a review of the positive drive patents cited above that the devices shown therein are not adapted for assembly with C-clip axles, once the positive drive itself has been fully assembled. This is normally true because of the use of the central cam member references above. Therefore, it is very important to provide a traction modifier which may be fully assembled, and subsequently assembled to a pair of axles utilizing some sort of inboard retention.

It is an object of the applicant to provide a positive drive that is simple to manufacture and repair without introducing substantially new manufacturing or mechanical know-how.

A further object is to provide a positive drive that has minimal size and weight.

Another object is to provide a positive drive of a design that has components that are similar to those existing in standard open, limited slip and/or locking differentials.

It is yet another object to provide a positive drive that may be produced on tools and equipment currently being used to produce existing open, limited slip and/or locking differentials.

Yet another object is to provide a traction modifier of a design in which inboard retention of the axles may be easily accomplished in an accepted manner.

Figure 1:
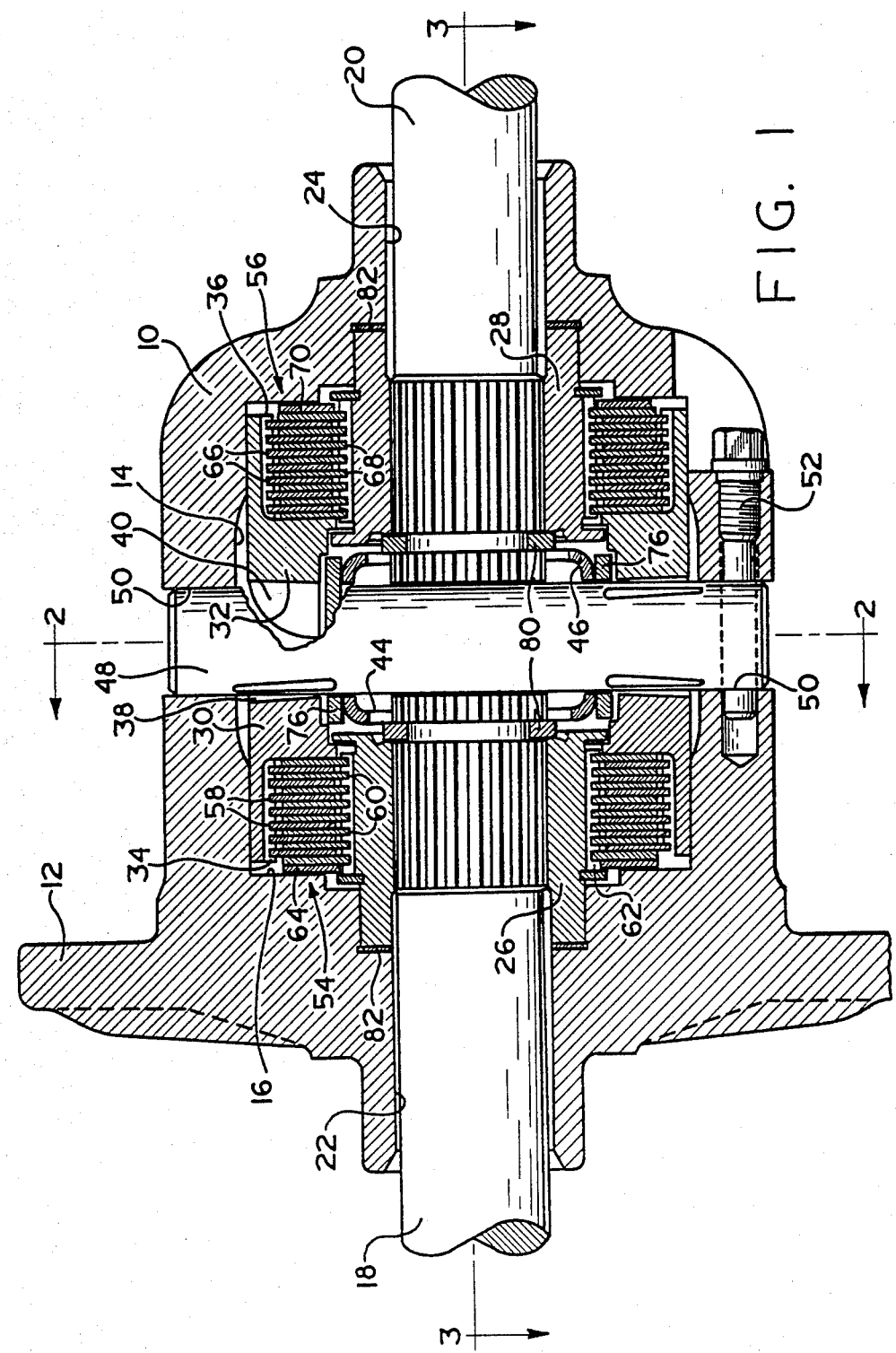
FIG. 1 is a fragmentary sectional view of a positive drive taken along line 1—1 of FIG. 2.
Figure 2:
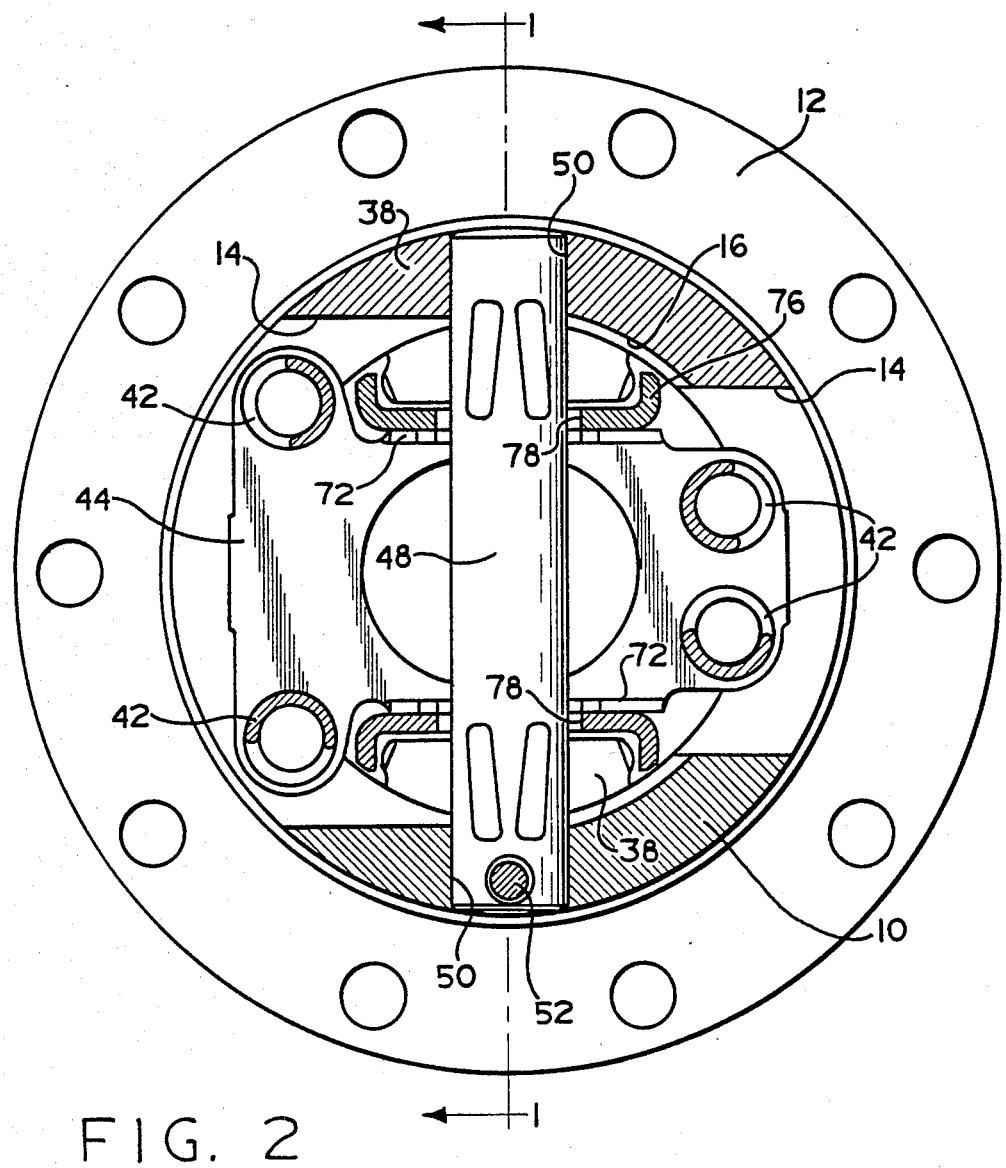
FIG. 2 is a sectional view taken along line 2—2 of FIG. 1.
Figure 3:
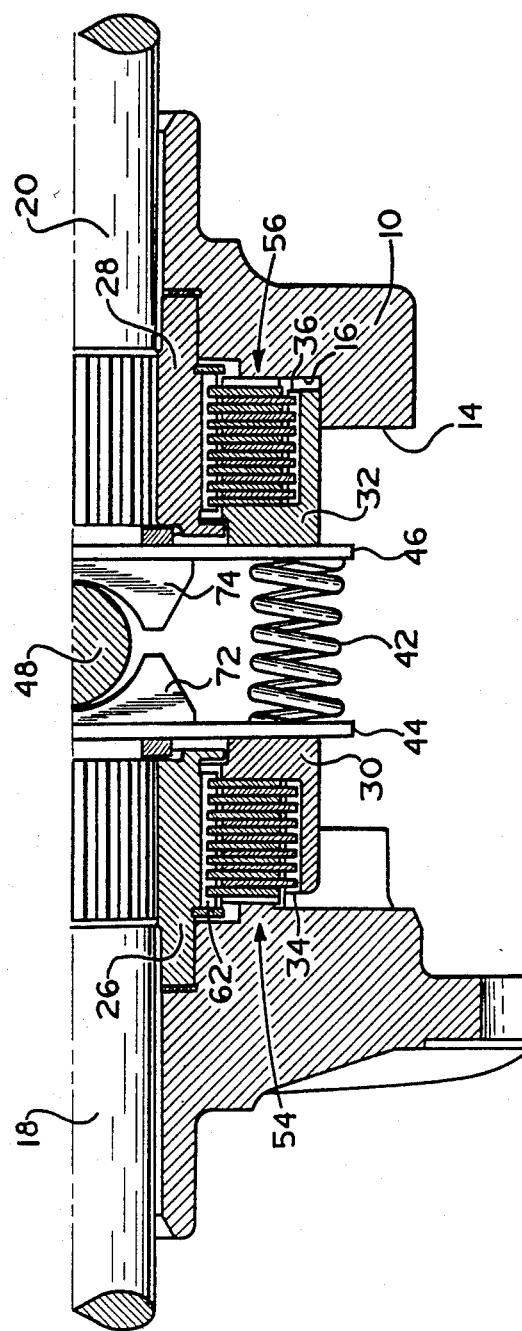
FIG. 3 is a sectional view of one-half of a positive drive taken along line 3—3 of FIG. 1.

In FIGS. 1–3 a one piece housing 10 has a flange 12 that is designed for securement to an input gear. A pair of windows 14 are located in housing 10 and are sized for insertion of the components of the positive drive within cavity 16 of housing 10. A pair of axles 18 and 20 are rotatable within axially aligned openings 22 and 24 in the housing.

Components of the drive include a pair of identical rotatable spline couplings 26 and 28 having internal teeth engaged with teeth on inner ends of axles 18 and 20. A pair of identical drive couplings 30 and 32 are journalled in cavity 16 for rotation relative to housing 10. Couplings 30 and 32 each include an internal array of teeth 34 and 36 and spaced, radially disposed cams 38 and 40 best illustrated in FIGS. 4–6. Preloaded springs 42 contact at each end a pair of identical spring plates 44 and 46 in contact with couplings 30 and 32 to bias the drive couplings axially outwardly toward axles 18 and 20.

Interposed between cams 38 and 40 is a shaft 48 having eight cam surfaces, four on each end, for engagement with cam surfaces of cams 38 and 40. The shaft projects through a pair of aligned openings 50 in housing 10 and is secured to the housing by a fastener 52. Although shown as generally cylindrical, shaft 48 may have a cross section that is not circular, e.g., the cross section may be a square, a hexagon, or of variable cross section as long as it may be placed within its given location.

Drive clutches 54 and 56 each include annular discs, a drive coupling, and a spline coupling. Dics 58 of clutch 54 have teeth engaged with teeth 34 of drive coupling 30 and discs 60 of clutch 54 are interposed between each of the discs 58 and have teeth engaged with an external array of teeth 62 on spline coupling 26. The toothed engagement of the discs ensure one-to-one rotation of each of the discs with the respective coupling. An annular thrust washer 64 is interposed between the disc 58 farthest to the left in FIG. 1 and housing 10. The disc 60 farthest to the right in FIG. 1 contacts a radially extending annular surface of drive coupling 30. Clutch 56 is configured similar to clutch 54 with discs 66 and 68 and thrust washer 70. The annular discs 58, 60, 66, and 68 are well known in the traction modifying differential art as illustrated by U.S. Pat. No. 3,313,180 and may be secured to the respective coupling by means other than teeth to accomplish the one-to-one rotation.

Spring plates 44 and 46 include a pair of spaced wings 72 and 74 which encircle shaft 48 and form a support for balking clamps 76. The balking clamps each include an opening 78 to loosely receive shaft 48.

To assemble the drive without the axles, the clutches 54 and 56 are first preassembled, turned so that the cams 38 and 40 are disposed 90 degrees relative to one another to allow for insertion into a window 14 and then are located together within cavity 16 through the window. The clutches are thereafter oriented as illustrated in FIG. 1 with cams 38 and 40 adjacent one another. The balking clamps are next located within the cavity in relation to cams 38 and 40. The spring plates 44 and 46 with springs 42 in place are then inserted within a window 14 and are aligned in a manner to allow the insertion of shaft 48 between wings 72 and 74 which will thus support each of the balking clamps 76. Shaft 48 is thereafter inserted within openings 50 and 78 between cams 38 and 40 and wings 72 and 74. Fastener 52 is then used to secure shaft 48 to housing 10 to complete the assembly. With the shaft 48 inserted as described, the positive drive itself is fully assembled, and may now be handled, shipped, etc. Typically, the fully assembled positive drive is then shipped to a vehicle manufacturer for assembly of the positive drive to the axles 18 and 20 within an assembled vehicle.

Axles 18 and 20 may be secured to the drive in a known manner. Briefly, the assembly includes the steps of removing shaft 48, locating the axles 18 and 20 one at a time thru drive couplings 26 and 28, installing "C" clips 80 within grooves in the end of the axles then pulling axles 18 and 20 outward to secure "C"clips 80 and then replacing shaft 48. The ends of the axles should preferably loosely touch shaft 48 with the "C" clips in engagement with one end of the spline coupling. The other ends of the spline coupling will contact a thrust washer 82 engaged with housing 10.

It will be apparent to those skilled in the art that, because the shaft 48 has to be removed to permit the installation of the C-clips on the axles, it would not be possible to install C-clips or other inboard retention means if an annular, central cam member were used in accordance with the prior art. Once such a central cam member is assembled within the positive drive, it cannot be removed to permit access to the inboard ends of the axles, except by disassembly of the entire positive drive. However, because the cam shaft 48 can be easily removed, then easily reinserted, the present invention is believed to provide the first positive drive design which is readily adapted for use with C-clip axles.

Many of the components illustrated are similar to those currently being used in limited slip differentials manufactured by Eaton Corporation. Further the assembly of the positive drive is very similar to that of current open or limited slip differentials manufactured by Eaton Corporation or other parties. Accordingly, the commonality of parts and the assembly techniques will be relatively common to production workers who manufacture the positive drive and mechanics who may subsequently be asked to repair or replace drives.

Figure 4:
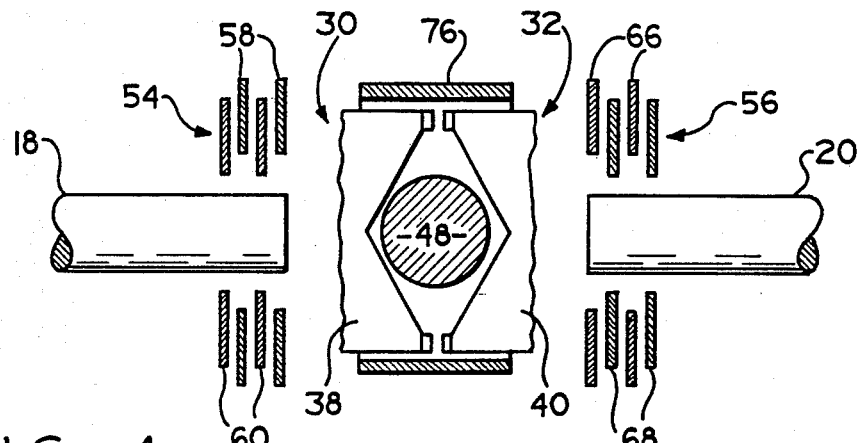
FIG. 4 is a view of components of the positive drive, in partial schematic, illustrating a positive drive in a nondriving condition.
Figure 5:
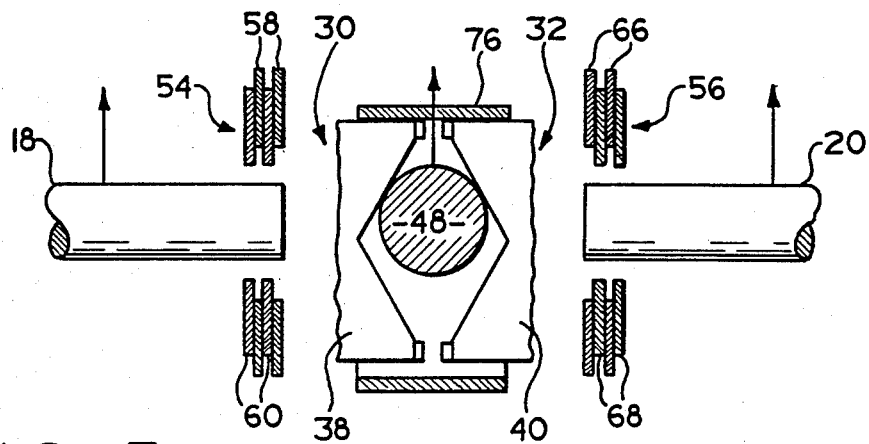
FIG. 5 is a view similar to FIG. 4 illustrating the drive driving both axles of a vehicle.
Figure 6:
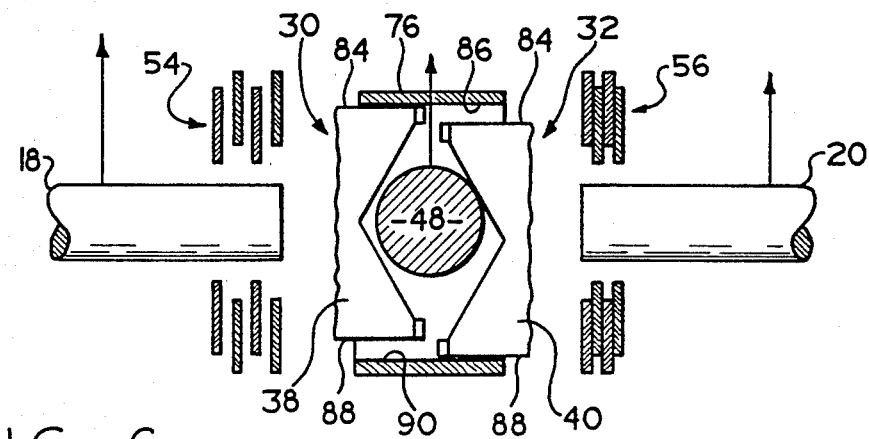
FIG. 6 is a view similar to FIG. 4 illustrating the drive driving one axle of a vehicle while permitting the other axle to free-wheel.

The operation of the positive drive is best described with reference to FIGS. 4–6. The positive drive may be used in either front wheel or rear wheel drive vehicles or between two drive axles. It will be described with reference to a rear drive automotive application. FIG. 4 shows the vehicle in a stationary position with axles 18 and 20 connected to ground engaging wheels. Shaft 48 is secured to housing 10 which is rotated by an input gear supplied with power from the engine of the automobile. Rotation of couplings 30 and 32 without springs 42 will be resisted to some degree by the friction between the discs. The degree of resistance is increased by the preloaded force exerted by springs 42. Upon rotation of housing 10 and, accordingly, shaft 48 during straight movement of the automobile, the surfaces on shaft 48 contact surfaces on cams 38 and 40 forcing couplings 30 and 32 axially outwardly. This axial movement results in contact between the discs and their engagement with the thrust washer and the housing. This results in a condition illustrated in FIG. 5 and the subsequent rotation of axles 18 and 20 in a one-to-one relationship. The clutches are designed as fully locking self-energizing clutches to ensure complete lock-up once engagement is initiated.

When the resistance to rotation on one axle is relatively low when compared to the resistance to rotation of the other axle, such as when one wheel of the automobile is located on ice and the other wheel is located on dry pavement, movement of shaft 48 can only result in driving the two axles at the same angular velocity. It is impossible for shaft 48 to drive one coupling 30 and 32 and, accordingly, one axle 18 or 29 faster than the other coupling or axle.

When the automobile is turning a corner, one axle will want to rotate faster than the other axle. Cornering initially causes a condition to exist similar to that illustrated in FIG. 5. However, as one axle, e.g., 18, begins to rotate faster than the other axle 20 as shown in FIG. 6, drive coupling 30 is rotated by axle 18 via clutch 54 in the direction of axle 18 causing cam 38 to move out of drive engagement with surfaces on shaft 48. This results in disconnecting axle 18 from coupling 30 and allowing axle 18 to rotate at any desired angular velocity faster than the angular velocity of axle 20. Axle 20, the slower rotating axle, will continue to be driven by shaft 48 through cam 40 and coupling 32.

Continued rotation of coupling 30 in the direction of rotation of axle 18 can again result in contact between cam 38 and surfaces on shaft 48 on the opposite drive cam and hence axial movement of coupling 30 and the driving of axle 18 at the angular velocity of axle 20. This continued rotation in a positive drive is prevented by limiting the rotational movement between couplings 30 and 32 relative to one another. Applicant has prevented this continued rotation by use of balking clamps 76. As illustrated in FIG. 6, if coupling 30 continues to rotate in the direction of axle 18 at an angular velocity exceeding coupling 32, contact is made between surface 84 of cam 38 and surface 86 of balking clamp 76. Balking clamp 76 is so configured to also ensure contact between surface 88 of cam 40 and surface 90 of balking clamp 76. This dual contact prevents the continued movement of cam 38 relative to shaft 48 thus preventing the cam 38 from again making contact with shaft 48 on the opposite side. This ensures that coupling 30 will not again be driven in an opposed direction by shaft 48 when the angular velocity of axle 18 exceeds axle 20.

Due to the limited amount of axle movement that exists between couplings 30 and 32 and the relative rotation between couplings 30 and 32 the tolerances within the clutches, the distances between surfaces 84 and 88 on cams 38 and 40, and the distance between surfaces 86 and 90 on balking clamps 76 must be carefully controlled. Due to the simplicity of design, however, of the balking clamp and the cams 38 and 40 this may be readily and inexpensively accomplished.

It can readily be seen that applicant has provided a new design of a positive drive in which critical tolerances may be easily maintained in mass production. Further, the design employs many features commonly known in current open and limited slip differentials. This results in a lower cost traction modifier since much current tooling and equipment may be used to manufacture the given positive drive design. Further minimal instruction will be required for mechanics familiar with current open or limited slip differentials to repair or replace the new positive drive. Applicant has accomplished all the foregoing while still maintaining minimal weight and size. Further the minimum weight and size has been accomplished with components that may be inexpensively manufactured without jeopardizing, in any manner, optimum operational characteristics of the positive drive. The design also adapts itself readily to the use of "C"clips or other inboard retention means for retaining the axles.

What is claimed is:

1. A positive drive comprising:
    (a) an input member adapted to be rotated by driving torque transmitted from a power source to rotate a pair of spaced output members defining an axis of rotation;
    (b) a single-piece housing operatively associated with said input member and surrounding both of said output members;
    (c) first clutch means having an engaged mode which locks in a predetermined rotational relationship said input member to one of said output members when said one output member is rotating at an angular velocity in the direction of torque transmittal that is equal to or less than a predetermined angular velocity of said other output member and having a disengaged mode which allows said one output member to rotate relative to said input member when said one output member is rotating at an angular velocity in the direction of torque transmittal that is greater than said predetermined angular velocity of said other output member;
    (d) second clutch means spaced from said first clutch means and having an engaged mode which locks in a predetermined rotational relationship said input member to said output member when said other output member is rotating at an angular velocity in the direction of torque transmittal that is equal to or less than a predetermined angular velocity of said one output member and having a disengaged mode which allows said other output member to rotate relative to said input member when said other output member is rotating at an angular velocity in the direction of torque transmittal that is greater than said predetermined angular velocity of said one output member;
    (e) a shaft extending through said single-piece housing, oriented approximately perpendicular to said axis of rotation, and located between said first and second clutch means;
    (f) first cam means located between said shaft and said first clutch means for moving said first clutch means from said disengaged mode to said engaged mode; and
    (g) second cam means located between said shaft and said second clutch means for moving said second clutch means from said disengaged mode to said engaged mode.

2. The positive drive of claim 1 wherein:
    (a) said input member is a housing defining a cavity;
    (b) said clutch means are located within said cavity; and
    (c) said shaft extends across said cavity and has a pair of ends connected to said housing.

3. The positive drive of claim 1 or 2 wherein:
    (a) each of said clutch means includes,
        (1) an inner member adapted to be operatively connected for rotation with the respective output member,
        (2) an outer member juxtaposed said inner member and movable into contact with said inner member to place the respective clutch means in said engaged mode and out of contact with said inner member to place said respective clutch means in said disengaged mode, and
    (b) said cam means for each of said clutch means contact said outer member of said respective clutch means.

4. The positive drive of claim 3 wherein:
    (a) a plurality of inner members are present in each of said clutch means;
    (b) a plurality of outer members are present in each of said clutch means, said outer members being interposed between said inner members of each of said clutch means;
    (c) each of said clutch means further includes a drive coupling secured to the outer members of the respective clutch means; and
    (d) said cam means for each of said clutch means is secured to said drive coupling of the respective clutch means.

5. The positive drive of claim 4 wherein:
    (a) each of said inner members is an annular friction disk; and
    (b) each of said outer members is an annular friction disk slidably secured to the respective drive coupling.

6. The positive drive of claim 3 wherein:
(a) each of said output members is a spline coupling;
(b) each of said clutch means further includes a drive coupling secured to the outer member of the respective clutch means; and
(c) said cam means for each of said clutch means is secured to said drive coupling of the respective clutch means.

7. The positive drive of claim 6 wherein:
(a) a plurality of inner members are present in each of said clutch means; and
(b) a plurality of outer members are present in each of said clutch means, said outer members being interposed between said inner members of each of said clutch means.

8. The positive drive of claim 2 wherein:
(a) each of said cam means comprises first and second cams engageable with said shaft to move the respective clutch means into said engaged mode;
(b) said first cams of said cam means face each other and are located adjacent one end of securement of said shaft to said housing; and
(c) said second cams of said cam means face each other and are located adjacent the other end of securement of said shaft to said housing.

9. The positive drive of claim 3 wherein:
(a) each of said cam means comprises first and second cams engageable with said shaft to move the respective clutch means into said engaged mode;
(b) said first cams of said cam means face each other and are located adjacent one end of securement of said shaft to said housing; and
(c) said second cams of said cam means face each other and are located adjacent the other end of securement of said shaft to said housing.

10. The positive drive of claim 5 wherein:
(a) each of said cam means comprises first and second cams engageable with said shaft to move the respective clutch means into said engaged mode;
(b) said first cams of said cam means face each other and are located adjacent one end of securement of said shaft to said housing; and
(c) said second cams of said cam means face each other and are located adjacent the other end of securement of said shaft to said housing.

11. The positive drive of claim 7 wherein:
(a) each of said cam means comprises first and second cams engageable with said shaft to move the respective clutch means into said engaged mode;
(b) said first cams of said cam means face each other and are located adjacent one end of securement of said shaft to said housing; and
(c) said second cams of said cam means face each other and are located adjacent the other end of securement of said shaft to said housing.

12. The positive drive of claim 2 wherein said housing includes at least one window communicating with said cavity and the exterior of said housing, said window being sized for the insertion of said clutch means into said cavity.

13. The positive drive of claim 1 or 2 further comprising resilient means biasing said first and second clutch means.

14. The positive drive of claim 1 or 2 wherein:
(a) each of said output members is a spline coupling adapted to receive one end of a vehicle axle having a removable annular retention member; and
(b) each of said spline couplings have an annular surface engageable with said annular retention member when an axle is located within said spline coupling to retain said spline coupling and said axle relative to one another.

15. The positive drive of claim 1 or 2 wherein:
(a) each of said cam means comprise two pairs of circumferentially spaced surfaces located 180 degrees relative to one another to define two generally diamond shaped openings aligned along the axis of said shaft;
(b) said shaft projects through said diamond shaped openings and is movable with said input member relative to said cam means to contact surfaces of each of said cam means to move said cam means to said engaged modes.

16. The positive drive of claim 15 further comprising:
(a) a pair of spaced annular drive couplings mounted for rotation relative to said input member and movable axially relative to said axis of rotation, each drive coupling being a part of one of said clutch means and moving said clutch means to the engaged mode upon axial movement; and
(b) each of said cam means is located on one of said drive couplings.

17. The positive drive of claim 16 wherein each of said clutch means includes:
(a) an inner member adapted to be operatively connected for rotation with the respective output member,
(b) an outer member juxtaposed said inner member and movable into contact with said inner member to place the respective clutch means in said engaged mode and out of contact with said inner member to place said respective clutch means in said disengaged mode, said outer member being in contact and movable with said drive coupling.

18. The positive drive of claim 17 wherein:
(a) a plurality of inner members are present in each of said clutch means;
(b) a plurality of outer members are present in each of said clutch means, said outer members being interposed between said inner members of each of said clutch means.

19. The positive drive of claim 18 wherein:
(a) each of said inner members is an annular friction disk; and
(b) each of said outer members is an annular friction disk slidably secured to the respective drive coupling.

20. The positive drive of claim 17 wherein each of said output members is an annular spline coupling rotatable about said rotation axis of said drive couplings.

21. A positive drive comprising:
(a) housing means;
(b) an input member adapted to be rotated by driving torque transmitted from a power source to rotate a pair of spaced output shafts which define an axis of rotation;
(c) first clutch means having an engaged mode which locks in a predetermined rotational relationship said input member to one of said output members when said one output member is rotating at an angular velocity in the direction of torque transmittal that is equal to or less than a predetermined angular velocity of said other output member and having a disengaged mode which allows said one output member to rotate relative to said input member when said one output member is rotating at an angular velocity in the direction of torque transmittal that is greater than said predetermined angular velocity of said other output member;

(d) second clutch means spaced from said first clutch means and having an engaged mode which locks in a predetermined rotational relationship said input member to said output member when said other output member is rotating at an angular velocity in the direction of torque transmittal that is equal to or less than a predetermined angular velocity of said one output member and having a disengaged mode which allows said other output member to rotate relative to said input member when said other output member is rotating at an angular velocity in the direction of torque transmittal that is greater than said predetermined angular velocity of said one output member;

(e) a camshaft rotated by said input member, oriented approximately perpendicular to said axis of rotation, and located between said first and second clutch means;

(f) first cam means located between said shaft and said first clutch means for moving said first clutch means from said disengaged mode to said engaged mode;

(g) second cam means located between said shaft and said second clutch means for moving said second clutch means from said disengaged mode to said engaged mode; and (h) each of said spaced output shafts including retention means disposed within said housing means, each of said retention means being operable to limit axial movement of the respective output shaft away from said camshaft.

22. The positive drive claim 21 wherein said housing means comprises a generally cylindrical housing portion defining a cavity and including at least one window communicating between said cavity and the exterior of said housing portion, said window being sized for the insertion of said first and second clutch means and said first and second cam means radially through said window into said cavity.

* * * * *